Dec. 29, 1925.

T. D. SADLER ET AL 1,567,999

ROTARY SAW

Filed Nov. 14, 1923   3 Sheets-Sheet 1

Inventor
T.D.Sadler,
D.K.Sadler,

By Wilkinson & Giusta
Attorneys

Dec. 29, 1925.
T. D. SADLER ET AL
ROTARY SAW
Filed Nov. 14, 1923
1,567,999
3 Sheets-Sheet 2
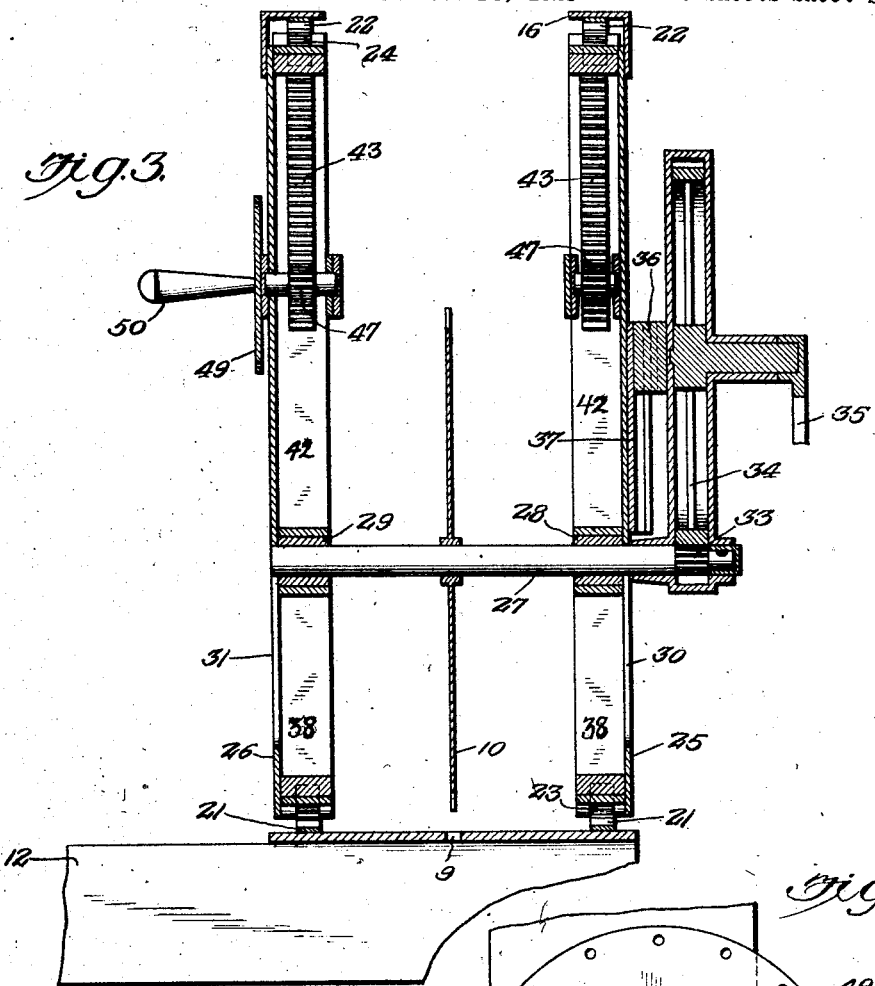
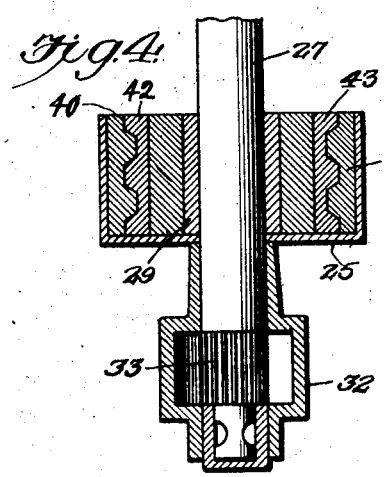
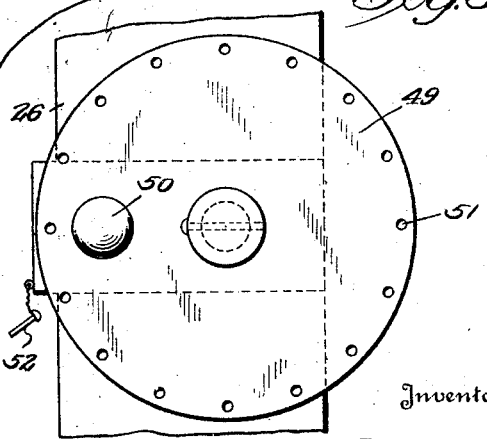
Inventor
T.D. Sadler.
D.K. Sadler.
By Wilkinson & Giusta
Attorneys

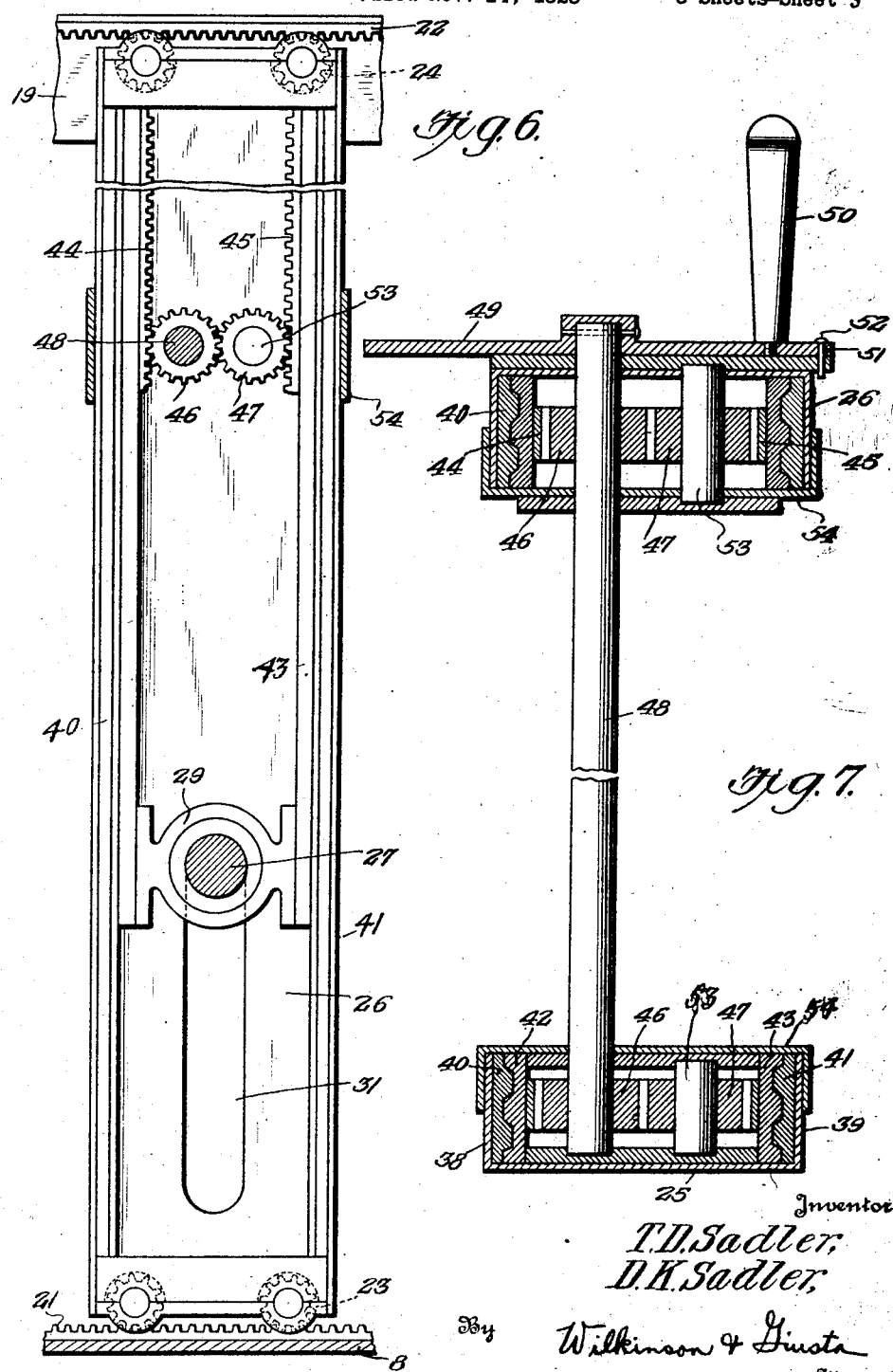

Patented Dec. 29, 1925.

1,567,999

UNITED STATES PATENT OFFICE.

THOMAS D. SADLER AND DUDLEY K. SADLER, OF NEW ORLEANS, LOUISIANA.

ROTARY SAW.

Application filed November 14, 1923. Serial No. 674,716.

*To all whom it may concern:*

Be it known that we, THOMAS D. SADLER and DUDLEY K. SADLER, citizens of the United Sates, residing at New Orleans, in the parish of Orleans and State of Louisiana, have invented certain new and useful Improvements in Rotary Saws; and we do hereby declare the following to be a full, clear, and exact description of the invention, such as will enable others skilled in the art to which it appertains to make and use the same.

The present invention relates to improvements in rotary saws and has for an object to provide a light, easily transported hand operated machine for use by carpenters or other wood workers in sawing, grooving or other operations in which rotary wood working tools are used.

Other objects of the invention are to provide a compact mechanism for mounting and operating a rotary saw; for producing a machine of few parts which are accessible for adjustment and repair; and for providing a rotary saw capable of both horizontal and vertical adjustment in which the saw is rotated with comparative ease through an arrangement of gearing adjustably mounted with the saw.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation, with parts broken away showing an improved machine constructed according to the present invention.

Figure 3 is an enlarged vertical section taken through the saw shaft and gearing.

Figure 4 is a horizontal section taken through one side of the movable frame and showing a portion of the saw shaft and its bearing.

Figure 5 is a fragmentary side view showing the frame locking disc.

Figure 6 is a vertical section taken between the two side portions of the movable frame, and Figure 7 is a horizontal section taken through the movable frame showing the arrangement of gearing for elevating and lowering the same.

Figure 1:
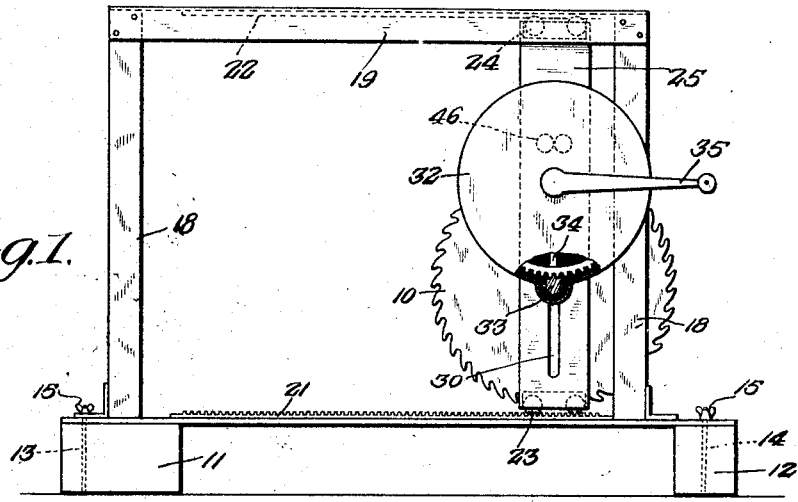

Referring more particularly to the drawings, 8 is a metal plate provided with a slot 9 in which to receive the circular saw 10.

The plate 8 is shown as resting upon the ends of the beams 11 and 12 and bolts 13 and 14 with the butter-fly or adjusting nuts 15 are employed to hold these parts adjustably together. A second plate 16 is secured by the adjustable bolts 17 to the other ends of the beams 11 and 12.

Upon the front plate 8 are erected the four fixed standards 18 which are connected at their top portions by the two longitudinal rails 19 and the two cross braces 20.

The plate 8 supports two racks 21 along its opposite edges and similar racks 22 are carried within the top rails 16 as shown more particularly in Figure 3. The parts of the frame work are preferably angle iron, although they may be made of other suitable material and in other appropriate shapes.

Meshing with the racks 21 and 22 are respectively the bottom toothed rollers 23 and top toothed rollers 24 carried by the two members 25 and 26 of the movable frame or carriage which supports the saw 10.

Figure 2:
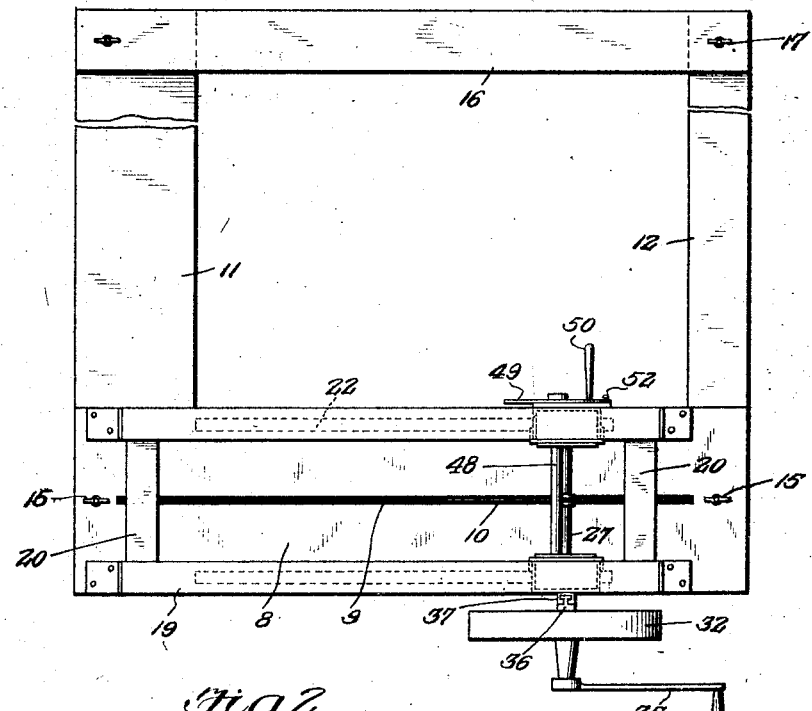
Figure 2 is a top plan view of the same.

This saw 10 is affixed upon the saw shaft 27 which is journaled in the bearings 28 and 29 disposed for vertical movement in the members 25 and 26. These members are substantially channel members and the end portions of the saw shaft 27 project through guide slots 30 and 31 which extend vertically in the lower portions of the members. The saw shaft 27 projects beyond the member 25 where it enters a housing 32 containing a pinion 33 which is affixed to the saw shaft and a gear wheel 34 mehing with the pinion and rotated by a hand crank 35. The gear casing 32 is of course adapted to slide vertically with the saw and the saw shaft and to this end the inner side of the gear casing carries a block 36 having a T-head as shown in Figure 2 to engage the complementally formed slot in the guide strip 37 secured to the side member 25.

Within the side flanges 38 and 39 of the side members 25 and 26, as shown in Figure 7, are the strips 40 and 41 provided with grooved inner surfaces receiving the similarly formed inner surfaces of the bars 42 and 43 which carry the racks 44 and 45. These bars 42 and 43 move up and down with the saw shaft and the bars are connected to the bearings 28 and 29 as shown in Figure 6.

Pinions 46 and 47 mesh with each other and with the racks 44 and 45 and a shaft 48 connects two of the alining gear wheels upon opposite side members of the movable frame. The shaft is provided at one side with a disc 49 carrying a handle 50 by which the shaft and pinions connected thereto may be rotated. The disc 49 as shown in Figure 5 is provided with edge perforations 51 which are adapted to register with the perforation upon an adjacent portion of the frame work. A pin 52 carried by the frame work is adapted to be passed through the registering perforations as indicated in Figure 7 whereby to lock the disc, shaft and pinions and subsequently the vertically moving portion of the frame against movement. The pinions 47 are carried by stub shafts 53 journaled in the side members of the frame work and in U-shape strips 54 secured to the flanges 38 and 39 in any appropriate manner.

In the use of the device the saw 10 is rotated by turning the handle 35. Great speed is obtained in the saw through the gearing 34 and 33. The saw may be raised and lowered by turning the handle 50 on the disc 49 after the pin 52 has been removed. The turning of the pinions will through the racks 34 and 35 move the bars 42 and 43 up and down and these bars will cause the saw shaft 27 to move therewith, the shaft traveling, and being guided, in the slots 30 and 31.

The saw is adjusted through the slot 9 of the plate 8 to engage the work beneath and as the saw cuts through the work the entire movable frame is shifted along the racks 21 and 22 for instance by pulling the movable frame with the left hand while the right is used to turn the crank 35.

In ripping, grooving or other tool work done along the longitudinal axis of the piece to be cut, the wooden frame is removed from the plate 8 and rearranged parallel to its axis.

The chief value of the machine will be to carpenters in wood cutting or joining operations on buildings in the course of construction where the use of power is impracticable. The machine can be used by carpenters or wood workers in all saw operations at present accomplished by the use of the hand saw and by carpenters or wood workers in grooving, or other operations in which rotary tools are used and also by metal workers in sawing metal bars or other light work accomplished by rotary tools.

The device will also be adapted for cutting bread, cheese or for use as a butcher's knife or saw.

It is obvious that the machine may be driven by hand, or by any other suitable power.

The edges of the plate 8 and the forward wooden beams are trued surfaces. The carpenter sets his try square at any desired angle, loosens the screw clamps, places one edge of the try square against the inner surface of the wooden strip and adjusting the edge of the plate to the blade of the try square. He then tightens the screw clamps and the machine is ready to cut. The machine may be laid across the work at any desired angle. The piece to be cut is pushed under and at right angles to the longitudinal axis of the plate and rests against and is guided by the forward wooden strip. The piece is securely fastened in any appropriate manner.

It is obvious that various changes and modifications may be made in the details of construction and design of the above specifically described embodiment of this invention without departing from the spirit thereof, such changes and modifications being restricted only by the scope of the following claims:—

What is claimed is:—

1. A rotary saw comprising, a support including a horizontal plate extending lengthwise of the support and having a central longitudinal slot therein, a pair of spaced apart frame members rising from opposite sides of the plate, a pair of top and bottom rack bars arranged in the top of each frame member and on the adjacent side portion of the plate with the racks of each pair facing each other and all of the racks arranged in register, a vertically disposed carriage above the plate having spaced side bars one within each frame member, spaced toothed rollers in the tops and bottoms of the side bars meshing with the racks to support the side bars, a bearing member mounted for vertical sliding movement in each side bar, a saw shaft journalled in said bearing members, operating gearing carried on one end of the shaft and movable therewith and with the bearing members a rotary saw on said shaft between the bearing members and in register with said slot in the plate, opposed racks in each bearing member, intermeshing pinions in each side bar engaging the opposed racks of the bearing members, a transverse shaft connecting a corresponding pinion of each side bar, and means for locking the shaft when adjusted.

2. A rotary saw comprising, a plate, spaced frame members rising longitudinally from the plate, a carriage in the frame members, vertically adjustable bearing members in the frame members, a saw shaft carried in the bearing members, a saw on the shaft between the bearing members, operating means on one end of the saw shaft, raising and lowering means for the bearing members mounted on the carriage, registering longitudinal racks in the tops and bottoms of the frame members, and spaced pinions on the carriage meshing with the racks for supporting the carriage and holding the same in upright position during longitudinal travel over the plate.

THOMAS D. SADLER.
DUDLEY K. SADLER.